United States Patent
Jochi et al.

(10) Patent No.: US 6,320,774 B2
(45) Date of Patent: Nov. 20, 2001

(54) AC WAVEFORM INVERTER POWER SUPPLY APPARATUS FOR METALLIC MEMBER JOINING OR REFLOW SOLDERING

(75) Inventors: Takashi Jochi; Kyoji Moro, both of Chiba-ken (JP)

(73) Assignee: Miyachi Technos Corporation, Chiba-Ken (JP)

( * ) Notice: Subject to any disclaimer, the term of this patent is extended or adjusted under 35 U.S.C. 154(b) by 0 days.

(21) Appl. No.: 09/761,192

(22) Filed: Jan. 18, 2001

(30) Foreign Application Priority Data

Jan. 18, 2000 (JP) .................................................. 12-008940

(51) Int. Cl.[7] .............................. B23K 9/09; H02M 3/24; H02M 5/42
(52) U.S. Cl. ....................... 363/98; 363/132; 219/130.51; 219/137 PS
(58) Field of Search .................................. 363/17, 58, 98, 363/132; 219/130.51, 137 PS, 108, 110

(56) References Cited

U.S. PATENT DOCUMENTS

| | | | |
|---|---|---|---|
| 5,349,159 | * | 9/1994 | Mita et al. ..................... 219/137 PS |
| 5,351,175 | * | 9/1994 | Blankenship ............................ 363/16 |
| 5,965,038 | * | 10/1999 | Nomura et al. ....................... 210/110 |
| 5,991,169 | * | 11/1999 | Kooken ................................... 363/17 |
| 6,046,424 | * | 4/2000 | Jochi ..................................... 219/110 |
| 6,051,807 | * | 4/2000 | Ogasawara et al. ............ 219/130.51 |
| 6,111,216 | * | 8/2000 | Stava ............................... 219/130.51 |
| 6,137,077 | * | 10/2000 | Moro et al. .......................... 219/108 |
| 6,207,927 | * | 3/2001 | Mita et al. ....................... 219/130.51 |

* cited by examiner

*Primary Examiner*—Bao Q. Vu
(74) *Attorney, Agent, or Firm*—Wenderoth, Lind & Ponack, L.L.P.

(57) ABSTRACT

The number of cycles R of a fundamental frequency <SET>F (Hz) for a set value Tw (ms) of a set weld time [WELD] is first found as a real number. The number of cycles R conforms to the number of times (real number) of repetition of the fundamental frequency <SET>F cycle in the interval of the set weld time Tw and is given as Tw×<SET>F (step $B_1$). An AC waveform cycle set value Ns (integer) for the set weld time Tw is then determined as an integer Min [N] that is equal to the number of cycles R or to the least one (i.e., the integer closest to R) of larger integers (N) than R (step $B_2$). An AC waveform cycle set frequency Fs (Hz) and a period Ts (ms) for the set weld time Tw is then found from the set number of cycles Ns. The set frequency Fs and the period Ts are given as Fs=1/Ts and Ts=Tw/Ns, respectively (step $B_3$). The thus obtained values (data) of the set frequency Fs and set number of cycles Ns are stored in the memory at predetermined storage positions thereof and are indicated on a setting screen (step $B_4$).

9 Claims, 15 Drawing Sheets

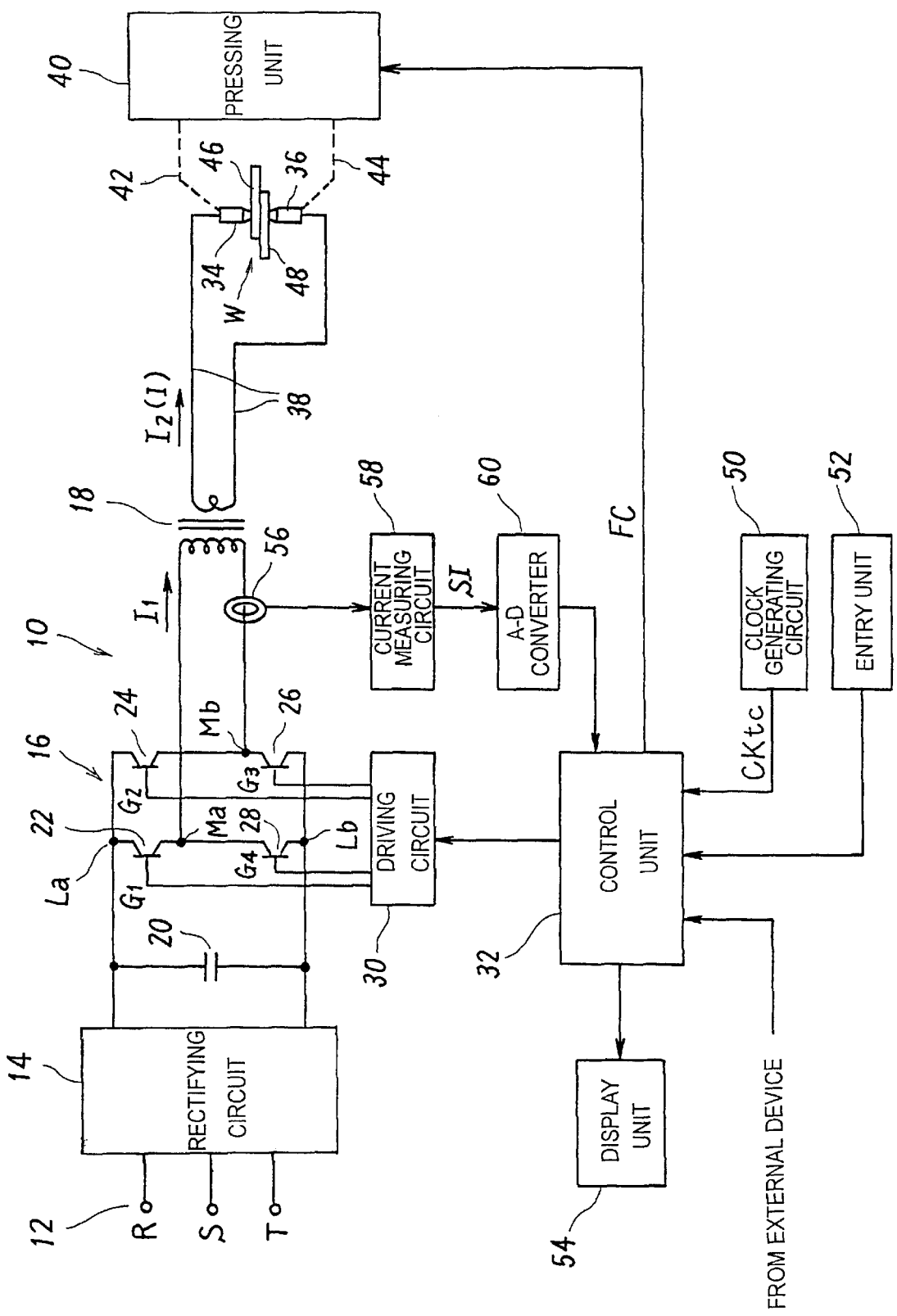

```
SCH#:000:
(SET) F=50Hz
         SQ    WELD1   COOL   WELD2   HOLD
        :0000: :0000: :0000: :0000: :0000:  ms
        HEAT   :0000:        :0000:          A
      (CONTROL)
```

```
SCH#:001:
(SET) F=50Hz
         SQ    WELD1   COOL   WELD2   HOLD
        :120:  :_20:  :_30:  :_66:  :200:  ms
        HEAT   :600:         :750:          A
      (CONTROL)
WELD1:F=50.0Hz    CYCLE=01
WELD2:F=60.6Hz    CYCLE=04
```

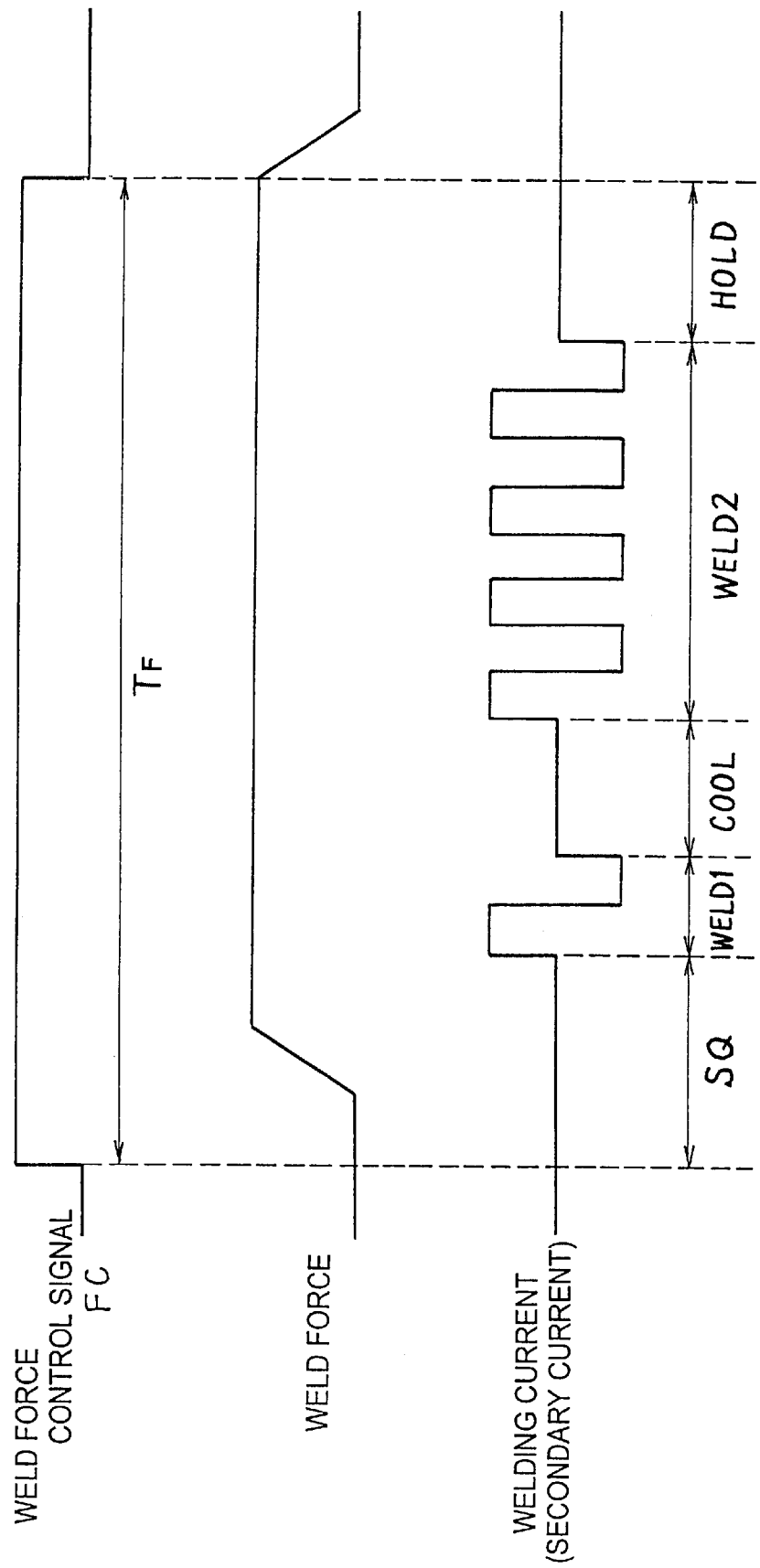

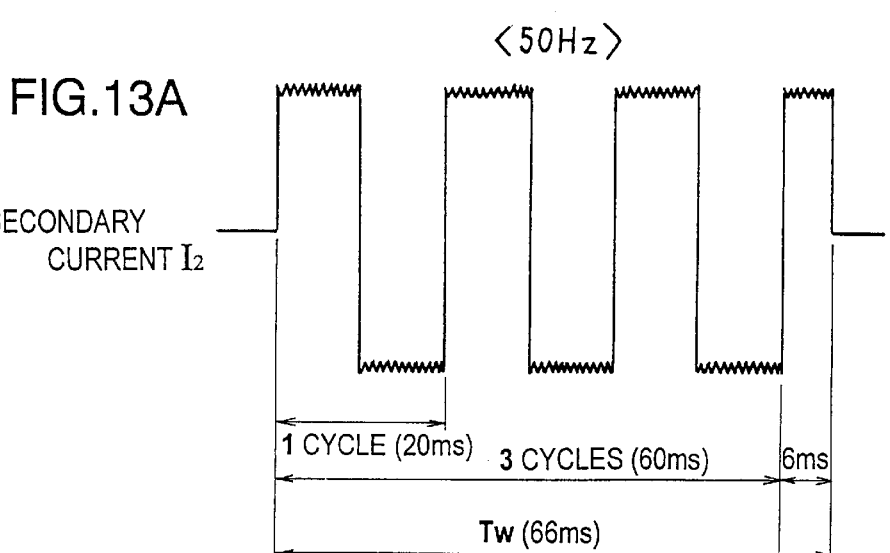
FIG.13A
FIG.13B
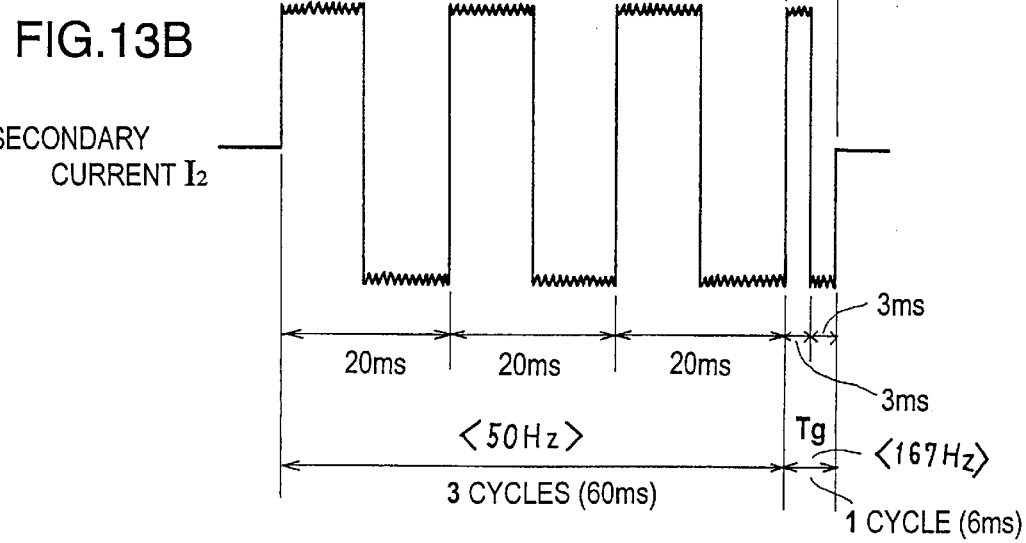
FIG.14

WELDING CURRENT (SECONDARY CURRENT) OF SINGLE-PHASE AC

1 CYCLE (20ms)

4 CYCLES (80ms)

WELDING CURRENT (SECONDARY CURRENT) OF AC WAVEFORM INVERTER

1 CYCLE (20ms)

WELDING CURRENT (PRIMARY CURRENT)

1 CYCLE (20ms)    66ms

3 CYCLES (60ms)   6ms

AC WAVEFORM INVERTER POWER SUPPLY APPARATUS FOR METALLIC MEMBER JOINING OR REFLOW SOLDERING

BACKGROUND OF THE INVENTION

1. Field of the Invention

The present invention relates generally to an inverter power supply apparatus for metallic member joining or reflow soldering, and, more particularly, to an AC waveform inverter power supply apparatus allowing an AC waveform current to flow on its transformer secondary side.

2. Description of the Related Arts

Of late years, AC waveform inverter power supply apparatuses are prevailing as power supply apparatus for use in resistance welders. The AC waveform inverter power supply apparatuses can obviate the disadvantages of the DC inverter power supply apparatuses that flow a DC welding current on their welding transformer secondary side while keeping the advantages of the DC inverter power supply apparatuses.

More specifically, the DC inverter power supply apparatuses have a high heat generation efficiency enough to ensure stabilized resistance welding with less spatters since the length of their effective weld time is remarkably larger at all times than that of the current-unsupplied time, as compared with single-phase AC thyristor controlled power supply apparatuses. Due to their fixed current direction or polarities between a pair of electrodes clamping workpieces, however, the DC inverter power supply apparatuses may often suffer from such deficiencies that one of the pair of electrodes is liable to be degraded or wear than the other, that the workpieces tend to be magnetized, and that poor quality readily occurs because of the residual magnetism. Furthermore, high-frequency pulses from the inverter are converted into DC currents by a rectifying circuit on the secondary side of the welding transformer. Hence, the rectifying circuit and means to cool the same must be provided with a need for the high-frequency welding transformer suited to pass the AC pulses of the inverter frequency therethrough, which inconveniently makes the most prevalent commercial frequency welding transformers unavailable.

In this respect, the AC waveform inverter power supply apparatuses provide the same inverter control as the DC inverter power supply apparatuses, on their welding transformer primary side, to thereby advantageously achieve the heat generation efficiency and stability equivalent to the DC inverter power supply apparatuses, without the need for the rectifying circuit on the welding transformer secondary side, thus rendering low-frequency transformers available by flowing the AC waveform welding current (secondary current) at a low frequency substantially level with the single-phase AC power supply apparatuses.

Due to the availability of the low-frequency welding transformers in common with the single-phase power supply apparatuses as described above, the AC waveform inverter power supply apparatuses typically set the primary side AC waveform frequencies to the commercial frequency as shown in FIGS. 17A and 17B so that the weld time can be managed by the number of cycles of commercial frequency which has customarily been used in the single-phase AC power supply apparatuses. One cycle time being defined as one cycle 20 ms (or 16.6 ms) of the commercial frequency 50 Hz (or 60 Hz), the weld time Ta is managed by the numbers of cycles, e.g., four cycles [80 ms (or 66.4 ms)].

From experiences of the DC inverter power supply apparatuses, however, more and more users are recently hoping to arbitrarily set desired weld time by the time. Therefore, if the AC waveform inverter power supply apparatuses can set the weld time to any desired length by the time (e.g., ms), It may not merely be significantly convenient for the users but also it may be possible to further fine the weld time, i.e., one of welding condition parameter values and thus to achieve an Improved weld quality.

In the AC waveform Inverter power supply apparatuses, however, a difficulty may arise when the user desired weld time does not coincide with the integral multiples of the cycles of the welding transformer fundamental frequency. For example, when selecting the weld time to be 66 ms with respect to one cycle 20 ms of the fundamental frequency as shown in FIG. 18, 6 ms is left over from three cycles (60 ms). In this case, if during the remaining weld time (6 ms) the current supply Is made with one polarity only, then excessive residual magnetic flux will remain In the welding transformer, which may possibly break the inverter switching elements.

SUMMARY OF THE INVENTION

The present invention was conceived in view of the above problems posed by the prior art. It is therefore an object of the present invention to provide an AC waveform inverter power supply apparatus for metallic member joining or reflow soldering, capable of arbitrary setting and managing of desired weld time without inducing any abnormality or degradation in its transformer.

It is another object of the present invention to provide an AC waveform inverter power supply apparatus for metallic member joining or reflow soldering, capable of finer setting of the weld time or current-supplying time to improve the work quality and quality management.

In order to attain the above objects, according to an aspect of the present invention, there is provided an AC waveform inverter power supply apparatus for metallic member joining or reflow soldering, comprising a rectifying circuit which converts an AC voltage of a commercial frequency into a DC voltage; an inverter which converts the DC voltage output from the rectifying circuit into a pulsed voltage of a high frequency; a transformer having a couple of primary terminals and a couple of secondary terminals, the couple of primary terminals being electrically connected to two output terminals, respectively, of the inverter, the couple of secondary terminals being electrically connected to a pair of electrodes, respectively, which join workpieces in the form of metallic members together, without intervention of any rectifying circuit; weld time setting means arranged to set a weld time by the unit of time; AC waveform cycle setting means arranged to divide the set weld time into a plurality of AC waveform cycles; and inverter control means arranged to provide a control of switching operations of the inverter in such a manner as to allow the inverter to issue the high-frequency pulses with one polarity in the former half cycle of divided each AC waveform cycle but to issue the high-frequency pulses with the other polarity in the latter half cycle thereof.

In the AC waveform inverter power supply apparatus of the present invention, when the user sets and enters a desired set value of each weld time by the unit of time (e.g., ms), the frequency setting means divide the set weld time into a plurality of (integer) AC waveform cycles so that the inverter control means can provide the current-supplying control by the set AC waveform cycles. Thus, applications of positive and negative currents can evenly be effected irrespective of the arbitrary weld time setting, to obviate any excessive residual magnetic flux. The user is also allowed to freely and more precisely set the weld time. The increased degree of freedom (width of selection) and the raised precision of the weld time will contribute to the process quality diversification and level enhancement.

Preferably, the AC waveform cycle setting means include means arranged to equally divide the set weld time into a plurality of AC waveform cycles. The AC waveform cycle setting means may include means arranged to divide the set weld time into a single or a plurality of first AC waveform cycles each having a predetermined fundamental frequency and arranged to divide a remaining weld time obtained by subtracting a weld time corresponding to the first AC waveform cycle(s) from the set weld time, into a single or a plurality of second AC waveform cycles having a frequency which is higher than and most approximate to the fundamental frequency.

The apparatus may further comprise AC waveform cycle setting information display means arranged to provide indications of the setting contents of the AC waveform cycle (e.g., number of cycles setting and frequency setting, etc.) determined by the AC waveform cycle setting means. Such configuration ensures the user management of the set weld time by the number of cycles, etc.

BRIEF DESCRIPTION OF THE DRAWINGS

The above and other objects, aspects, features and advantages of the present invention will become more apparent from the following detailed description when read in conjunction with the accompanying drawings, in which:

FIG. 1 is a block diagram showing the structure of an AC waveform inverter power supply apparatus for resistance welding in accordance with an embodiment of the present invention;

FIG. 7 shows welding sequence timings or waveforms that correspond to the setting example (numerical values) appearing on the setting screen of the embodiment;

FIGS. 13A and 13B are waveform diagrams showing the secondary AC frequency/cycle setting method of a variant of the embodiment;

FIG. 14 shows an example of the setting screen indications corresponding to the setting method of FIG. 13;

DESCRIPTION OF THE PREFERRED EMBODIMENTS

Figures 2A, 2B, 3:
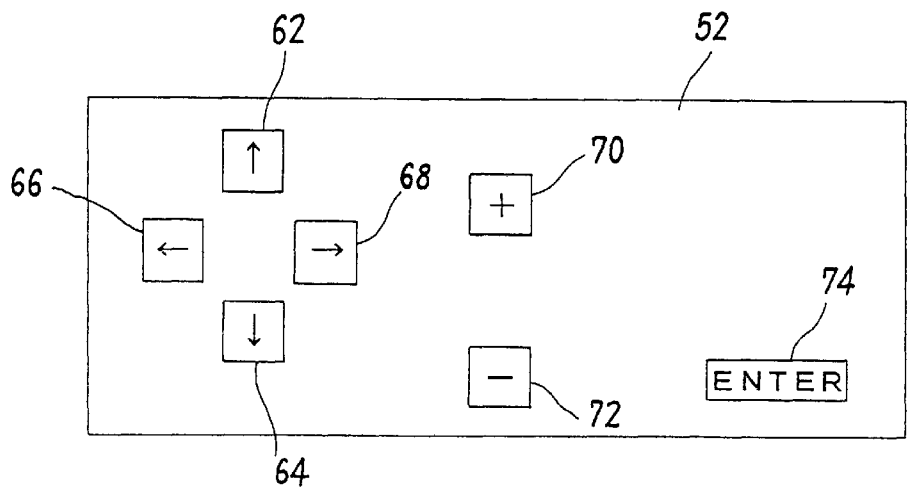
FIGS. 2A and 2B illustrate setting screens included in the power supply apparatus of the embodiment.
FIG. 3 shows key switches of an entry unit included in the power supply apparatus of the embodiment.

The present invention will now be described with reference to FIGS. 1 to 16A and 16B which illustrate presently preferred embodiments thereof in a non-limitative manner.

FIG. 1 depicts the structure of an AC waveform inverter power supply apparatus in accordance with an embodiment of the present invention.

The power supply apparatus comprises a power supply unit generally designated at 10. The power supply unit 10 includes a three-phase rectifying circuit 14, an inverter 16 and a step-down welding transformer 18. The three-phase rectifying circuit 14 consists of e.g., six diodes that are three-phase bridge connected to each other and serves to full-wave rectify a three-phase AC voltage (R, S, T) of a commercial frequency input from a three-phase AC power terminal 12, into a DC voltage. The DC voltage output from the three-phase rectifying circuit 14 is smoothed out by a capacitor 20 and then fed to input terminals [La, Lb] of the inverter 16.

The Inverter 16 consists of four transistor switching elements 22, 24, 26 an 28 in the form of, e.g., GTRs (giant transistors) or IGBTs (insulated gate bipolar transistors). Of the four switching elements 22 to 28, a first set of (positive side) switching elements 22 and 26 are simultaneously switching (ON/OFF) controlled at a predetermined inverter frequency (e.g., 1 kHz) in response to in-phase inverter control signals $G_1$ and $G_3$ that are fed via a driving circuit 30 from a control unit 32. A second set of (negative side) switching elements 24 and 28 are simultaneously switching (ON/OFF) controlled at the inverter frequency in response to in-phase inverter control signals $G_2$ and $G_4$ that are fed via the driving circuit 30 from the control unit 32.

The inverter 16 has output terminals [Ma, Mb] that are electrically connected to opposite ends, respectively, of a primary coil of the welding transformer 18. A pair of electrodes 34 and 36 for resistance welding are electrically connected via only secondary conductors 38 to opposite ends of a secondary coil of the welding transformer 18, without intervention of any rectifying circuit.

The electrodes 34 and 36 are made of a metal having a high thermal conductivity, e.g., a copper alloy and are releasably attached to upper and lower electrode support members 42 and 44, respectively, of a pressing unit 40. The pressing unit 40 incorporates a pressure driving unit not shown having an air cylinder for example, to drive, e.g., the upper electrode support member 42 in response to a press control signal FC from the control unit 32 such that the upper electrode 34 is abutted and pressed from above against workpieces (46, 48) mounted on the lower electrode 36.

The control unit 32 of the power supply apparatus is comprised of a microcomputer that includes a CPU, a ROM (program memory), a RAM (data memory), an interface circuit, etc. The control unit 32 provides not merely all intra-apparatus controls, e.g., current-supplying control (especially inverter control), various welding conditions setting or display process but also provides desired controls to the pressing unit 40 or other external associated devices. A clock generating circuit 50 sends a clock signal $CK_{tc}$ to the control unit 32, the clock signal $CK_{tc}$ defining fundamental or unit cycle tc for the switching control of the inverter 16.

An entry unit 52 includes a keyboard or key switches disposed on an operation panel not shown of the power supply apparatus, for use in setting and entry of various conditions for resistance welding. A display unit 54 includes a display, e.g., a liquid crystal display disposed on the operation panel to indicate set values, measured values, etc., of various conditions under the control of the control unit 32.

To ensure the execution of the current feedback in the current-supplying control, the power supply apparatus is provided with a current sensor 56 in the form of a current transformer attached to the primary circuit conductors (it may also be attached to the secondary side) of the power supply unit 10 so that from an output signal of the current sensor 56 a current measuring circuit 58 can acquire a primary current $I_1$ or secondary current $I_2$ measured value (e.g., effective value, mean value or peak value) as an analog current measurement signal SI, which in turn is converted by an A-D converter 60 into a digital signal and fed to the control unit 32.

Description will then be made of the function and operation setting major welding conditions for a single welding sequence in the power supply apparatus.

FIG. 2A depicts a "schedule" screen appearing on the display of the display unit 54. On the "schedule" screen the user is allowed to set and input various time parameters and current parameters for the single welding sequence.

In the shown example, time parameter setting items appearing on the "schedule" screen include initial squeeze time [SQ], first weld time [WELD1], cooling time [COOL], second weld time [WELD2] and hold time [HOLD], whilst current parameter setting items include current values [HEAT] (Is) in the first and second weld times [WELD1] and [WELD2]. The set values for these setting items are collectively managed by schedule numbers or codes [SCH#].

On the "schedule" screen there also appears separately set fundamental frequency <SET>F. The fundamental frequency <SET>F is normally set to a value in the vicinity of a rated frequency (e.g., 50 Hz) of the welding transformer 18, or instead, it may be set to any value desired by the user.

As shown in FIG. 3, the keyboard of the entry unit 52 is provided with e.g., cursor keys 62 to 68, plus (+) and minus (−) keys 70 and 72, and an enter key (ENTER) 74. The user vertically or horizontally moves a cursor on the screen by means of the cursor keys 62 to 68 to select a desired setting item. The user then selects or modifies the setting item value by the plus (+) and minus (−) keys 70 and 72 and finally determines (enters) the input set value by the enter key (ENTER) 74.

Figure 4:
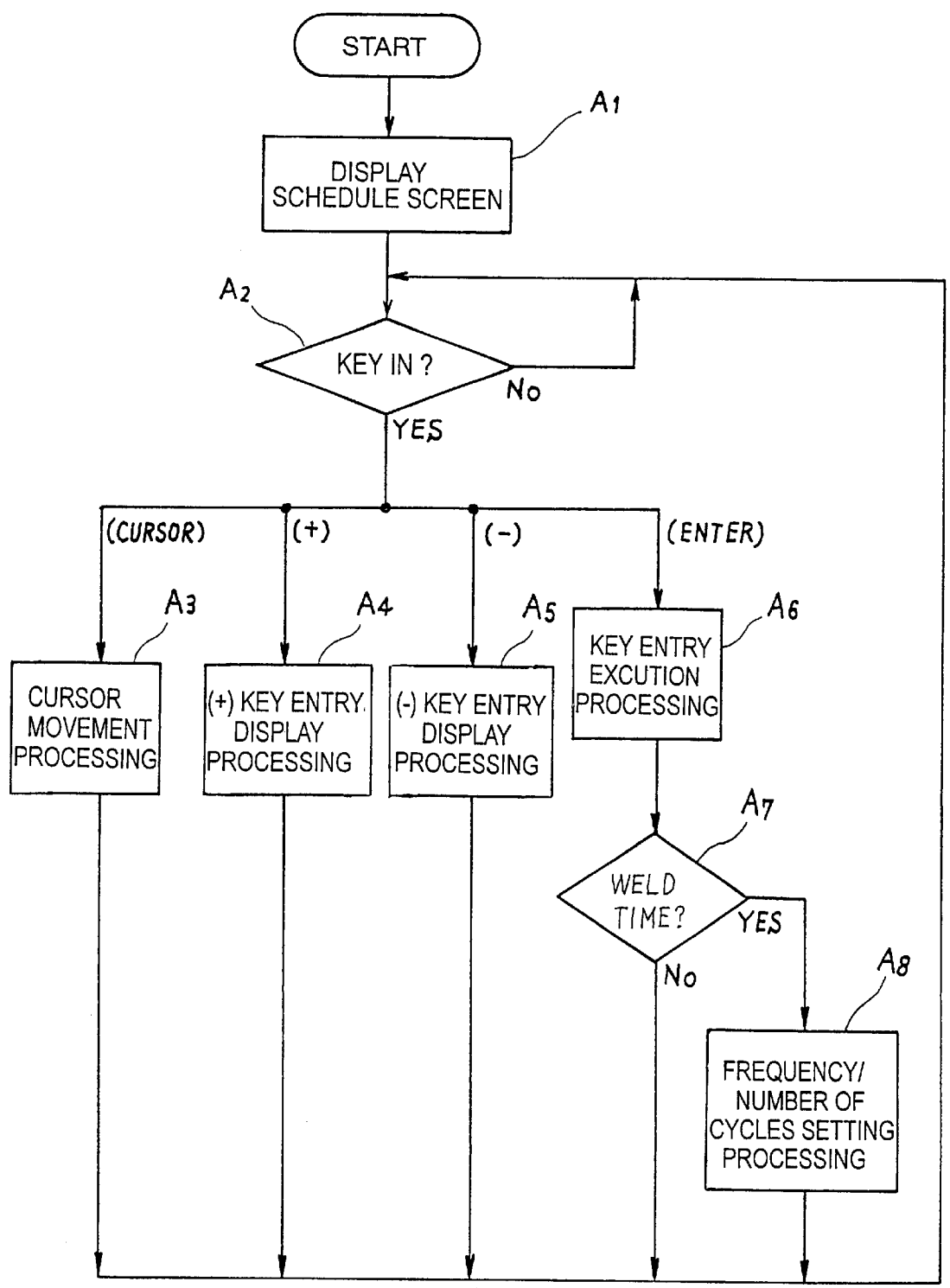
FIG. 4 is a flowchart showing the processing procedure effected by a control unit for schedule mode in the embodiment.

FIG. 4 depicts the procedure of processings effected by the control unit 32 in a "schedule" screen mode. When the schedule mode is selected, the control unit 32 allows the "schedule" screen as shown in FIGS. 2A and 2B to appear on the display of the display unit 54 (step $A_1$) and, in response to key entries (step $A_2$) from the above key buttons 62 to 74 of the entry unit 52, executes predetermined processing (steps $A_3$ to $A_8$).

More specifically, each time one of the cursor keys 62 to 68 is pressed, the control unit 32 executes cursor move processing (step $A_3$) to move the cursor toward the direction instructed by the key entry. When the plus (+) key 70 is pressed, the control unit 32 executes plus (+) key entry processing (step $A_4$), whilst when the minus (−) key 72 is pressed, it executes minus (−) key entry processing (step $A_5$). In these key entry display processes, the numerical value at the cursor position is incremented or decremented by one for updating, and the updated numerical value is displayed on the screen with the numerical value data being retained in an appropriate storage region or register within the memory. When the enter key (ENTER) 74 is then pressed, the control unit 32 carries out key entry execution processing (step $A_6$) to determine the numerical value at the cursor position as a set input value for the associated setting item, to thereby store the numerical value data at a predetermined storage position within the memory.

In the setting example shown in FIG. 2B, selected as the schedule number [SCH#] is 001 under which the initial squeeze time is set to 120 (ms) the first weld time [WELD1] to 20 (ms), the cooling time to 30 (ms), the second weld time [WELD2] to 66 (ms), and the hold time [HOLD] to 200 (ms), with the current values [HEAT] (Is) of the first weld time [WELD1] and the second weld time [WELD2] being set to 600 (A) and 750 (A), respectively.

After the completion of the key entry execution process (step $A_6$), the control unit 32 judges whether the currently set and entered setting item is the weld time [WELD] (step $A_7$), and if affirmative, then enters into the routine (step $A_8$) for "frequency/number of cycles setting processing".

Figure 5:
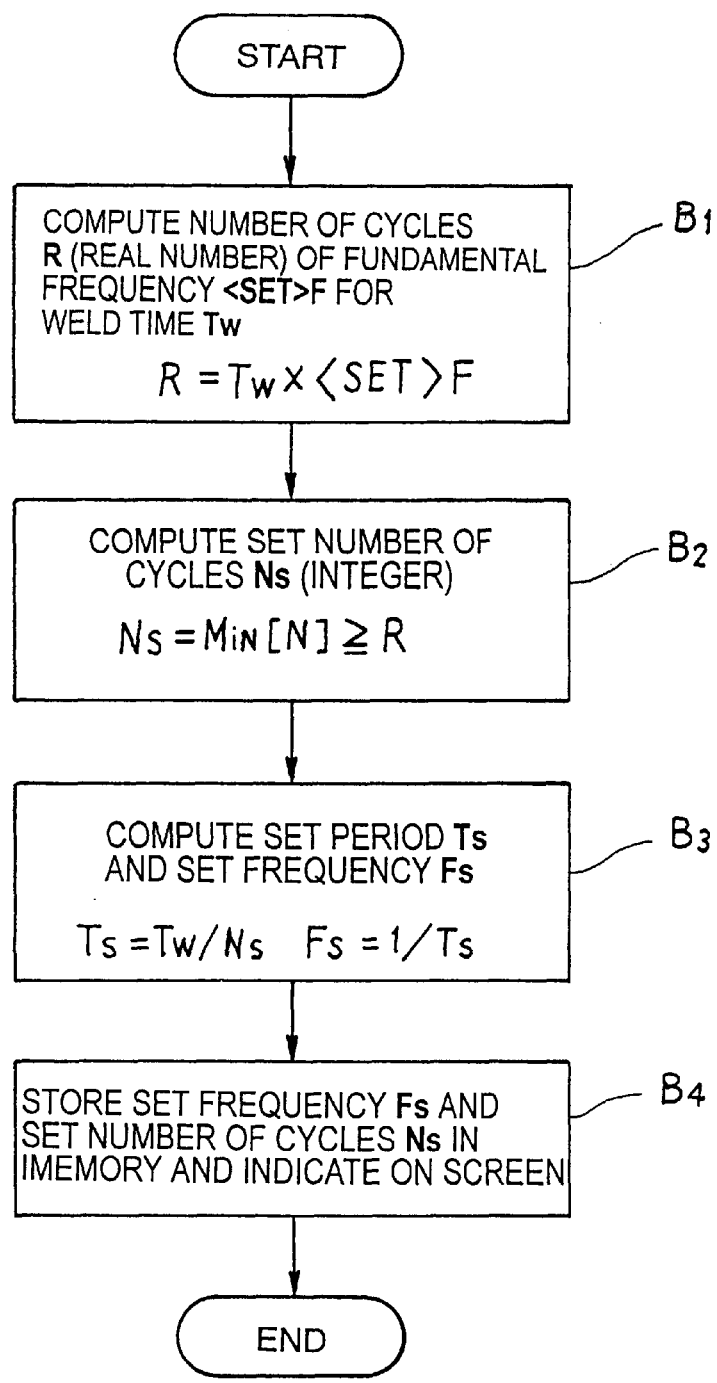
FIG. 5 is a flowchart showing the processing procedure effected by the control unit for secondary AC waveform frequency/cycle setting in the embodiment.

FIG. 5 depicts the procedure of the "frequency/number of cycles setting processing" effected in this embodiment.

In this routine, the number of cycles R of the fundamental frequency <SET>F (Hz) for the set value Tw (ms) of the set weld time [WELD] is first found as a real number. This number of cycles R conforms to the number of times (real number) of repetition of the fundamental frequency <SET>F period or the AC waveform cycle in the interval of the set weld time Tw and is given as Tw×<SET>F (step $B_1$).

From the thus obtained number of cycles R, the AC waveform cycle set value Ns for the set weld time Tw is then determined as an integer value. In this embodiment, selected as the set number of cycles Ns is an integer Min [N] that is equal to R or to the least one of larger integers (N) than R (i.e., an integer closest to R) (step $B_2$).

The set frequency Fs (Hz) and the period Ts (ms) of the secondary AC waveform cycle for the set weld time Tw is then found from the set number of cycles Ns. The set frequency Fs and the period Ts are given as Fs=1/Ts and Ts=Tw/Ns, respectively (step $B_3$).

The thus obtained values (data) of the set frequency Fs and set number of cycles Ns are stored in the memory at predetermined storage locations thereof and, as shown in FIG. 2B, indicated in the items [F] and [CYCLE], respectively, on the "schedule" screen (step $B_4$). Although the set period Ts is not indicated, the value (data) of Ts or Ts/2 is also stored in the memory since the unit current-supplying period (Ts/2) corresponding to the half cycle of the secondary AC waveform is an indispensable parameter value in the inverter control.

In the example of FIG. 2B, the first weld time [WELD1] and second weld time [WELD2] are 20 (ms) and 66 (ms), respectively, relative to the fundamental frequency <SET>F of 50 Hz.

In such a case, in the "frequency/number of cycles setting processing" for the set value Tw (20 ms) of the first weld time [WELD1], the set number of cycles Ns is 1 due to the number of cycles R of the fundamental frequency <SET>F being 1, and hence the set frequency Fs results in 50.0 Hz that is equal to the fundamental frequency <SET>F.

On the other hand, in the "frequency/number of cycles setting processing" for the set value Tw (66 ms) of the second weld time [WELD2], the number of cycles R of the fundamental frequency <SET>F is a decimal 3.3, so that the set number of cycles Ns results in 4 with the set frequency Fs of 60.6 Hz.

Figure 6A:
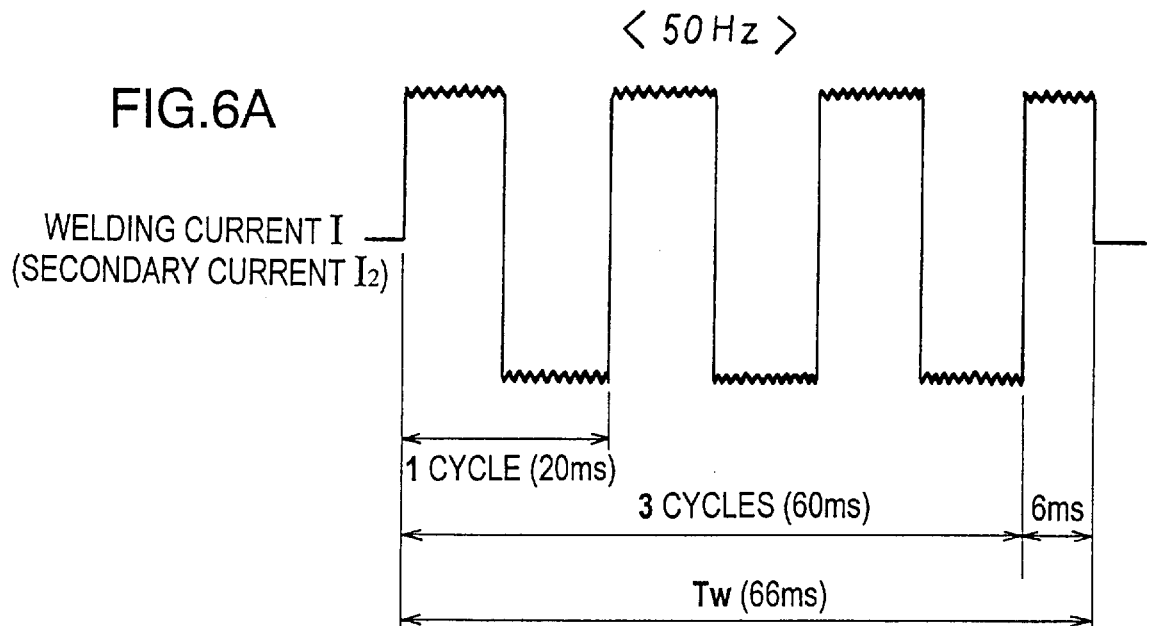
FIGS. 6A and 6B are waveform diagrams showing the secondary AC frequency/cycle setting method of the embodiment.
Figure 6B:
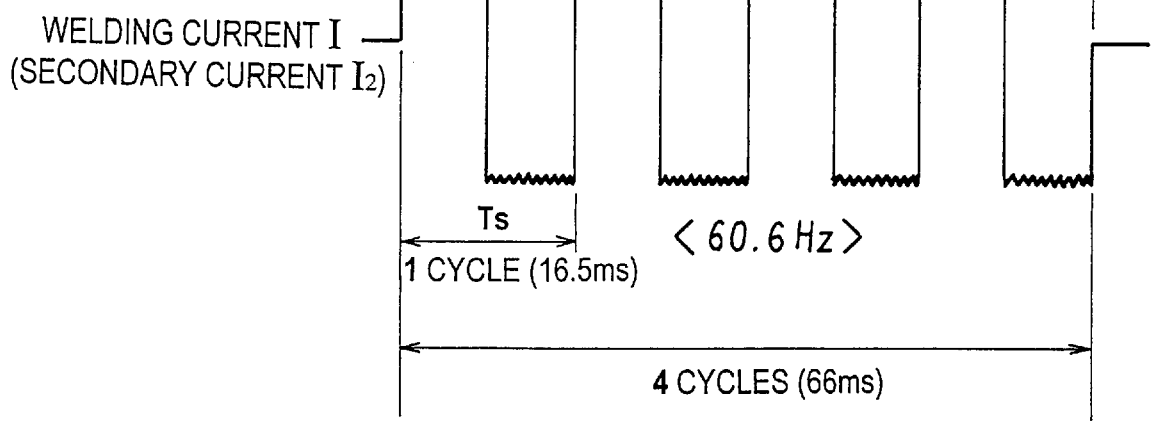

FIGS. 6A and 6B depict a method of the "frequency/number of cycles setting processing" in this case. Provided that the frequency of the AC welding current I is equal to the fundamental frequency 50 Hz with respect to the set value Tw (66 ms) of the second weld time [WELD2] selected by the user, then 6 ms is left over as shown in FIG. 6A.

However, by selecting the set frequency Fs and set number of cycles Ns of the AC welding current (secondary current) I to 60.6 Hz and 4, respectively, for the set value Tw (66 ms) of the second weld time [WELD2] through the "frequency/number of cycles setting processing", an AC waveform of a certain cycle can be obtained without any remainder.

FIG. 7 depicts welding sequence timings or waveforms corresponding to the setting example (numerical values) of FIG. 2B. Squeeze-on time $T_F$ conforms to the sum of set values of the squeeze time [SQ], first weld time [WELD1], cooling time [COOL], second weld time [WELD2] and hold time [HOLD].

In this embodiment, when the user sets and enters a desired set value Tw by the unit of time (ms) for the first and second weld time [WELD1] and [WELD2], the power supply apparatus sets a frequency $F_2$ of a secondary AC waveform cycle of which integral multiples coincide with the set weld time Tw, for each weld time [WELD] by the above "frequency/number of cycles setting processing". The set frequency $F_2$ is then defined as a value equal to or slightly higher (at most several tens of %) than the set fundamental frequency Fs. This will substantially obviate any adverse effect on the characteristics of the welding transformer 18.

It is to be noted that the common welding transformers are remarkably apt to become degraded or break upon supply of the AC power having a frequency lower than each specific rated frequency, as compared with the case of supply of the AC power of a frequency higher than the rated frequency.

The control unit 32 starts a single welding sequence in response to receipt of a predetermined start signal from an external device such as a welding robot.

Previous to the start of the welding sequence, the control unit 32 identifies the schedule number SCH# to be executed, from set values on the screen of the display unit 54 or from data attendant on the start signal. The control unit 32 then retrieves all required set values of conditions (data) managed by the thus identified schedule number SCH# and carries out the welding sequence in accordance with the set condition values.

In case of the setting example of FIG. 2B, the control unit 32 provides a control of the parts at the welding sequence timings as depicted in FIG. 7. First, the control unit 32 allows the weld force control signal FC to go active (high) so that the pressing unit 40 can start its pressing operation. The pressing unit 40 lowers the upper electrode support member 42 to press the upper electrode 34 against the workpieces W (46, 48) mounted on the lower electrode 36 to squeeze them. At a predetermined timing after the arrival of the weld force at a predetermined value, i.e., after the elapse of the squeeze time [SQUEEZE] from the start of the squeezing operation, the power supply unit 10 starts the supply of current for the first weld time [WELD1].

Figure 8:
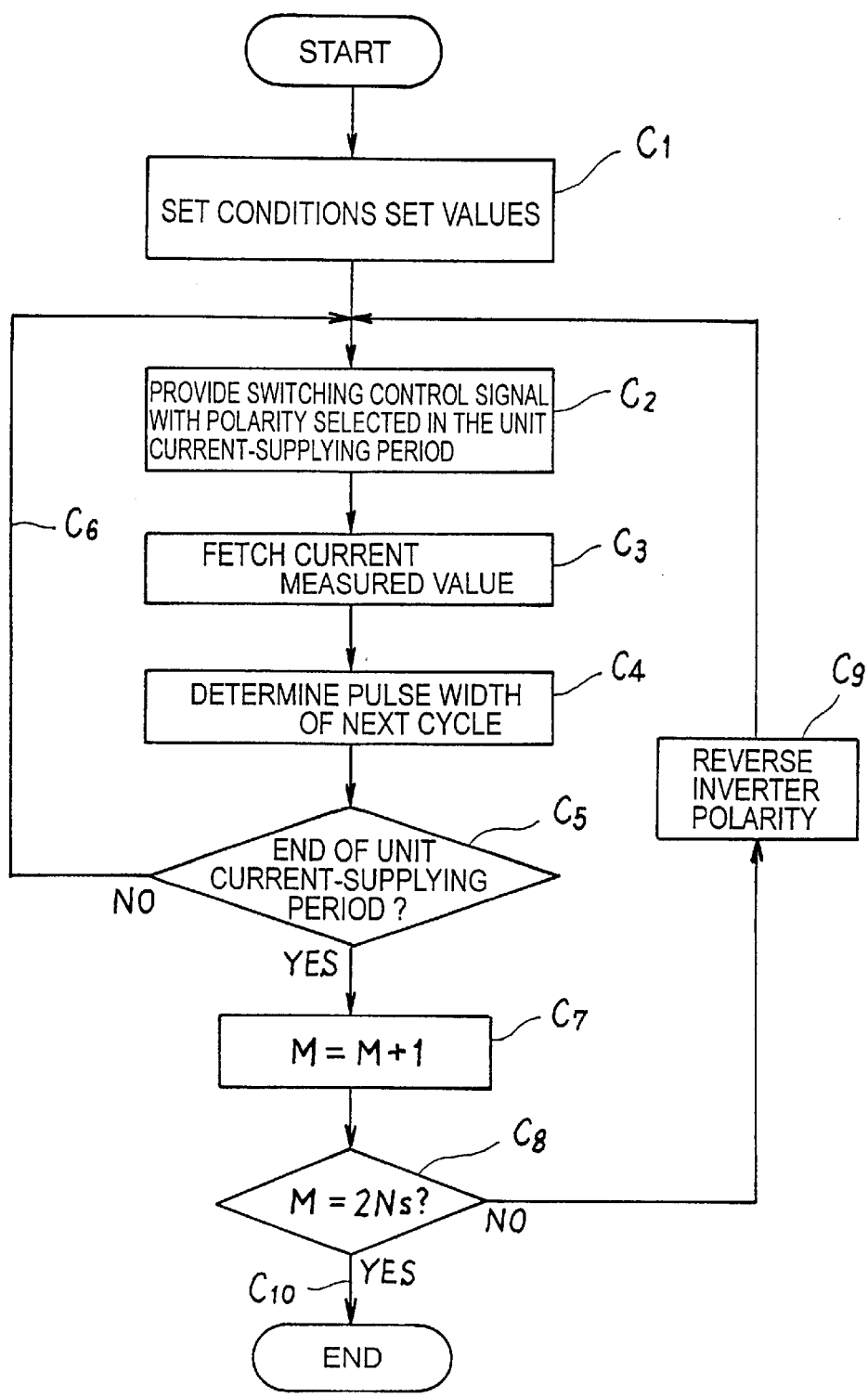
FIG. 8 is a flowchart showing the processing procedure effected by the control unit for current-supplying control in the embodiment.

FIG. 8 depicts the current-supplying control procedure for each weld time [WELD] in this embodiment.

First, set into respective predetermined registers are required set condition values related to the supply of welding current in the first weld time [WELD1], such as the current value Is (600 A), the secondary AC waveform set frequency Fs (50.0 Hz), the set number of cycles Ns (1), and unit current-supplying period Ts/2 (10 ms) (step $C_1$).

Due to conformity of the AC waveform half cycle to the unit current-supplying period Ts/2 in the AC waveform inverter power supply apparatus, the value (2Ns) obtained by multiplying the set number of cycles Ns by 2 is set as a set value of count in a current-supplying cycle counter for counting the number of times of repetition of the supply of current in the unit current-supplying period. Furthermore, the initialization for supply of current may include setting of the inverter polarity in the first unit current-supplying period and setting of the initial values of the pulse width, etc., of the first high-frequency pulse in each unit current-supplying period.

The control unit 32 then selects a predetermined polarity, e.g., positive polarity in the first unit current-supplying period Ts/2 (10 ms) and feeds switching signals $G_1$ and $G_3$ having an initial pulse width via the driving circuit 30 to the positive side (first set of) switching elements 22 and 26 of the inverter 16, to turn on the switching elements 22 and 26 (step $C_2$). The negative side (second set of) switching elements 24 and 28 remain OFF.

When a welding current I (secondary current $I_2$) and a primary current $I_1$ flow through the secondary and primary circuits, respectively, of the welding transformer 18 during the first switching cycle, the current sensor 56 provides as its output a current detection signal indicative of an instantaneous value of the primary current $I_1$ so that the current measuring circuit 58 can acquire a measured value of current (effective value or mean value) Si of the primary current $I_1$ or of the secondary current $I_2$ in this switching cycle.

The control unit 32 fetches a measured value of current Si from the current measuring circuit 58 by way of the A-D converter 60 (step $C_3$) and compares the measured value of current Si with a current set value [HEAT] (Is) to determine a pulse width (switching-ON period) tp in the next switching cycle from the comparison error (step $C_4$).

In the second switching cycle, the control unit 32 feeds the switching control signals $G_1$ and $G_3$ having the pulse width tp to the positive side switching elements 22 and 26 of the inverter 16, to turn on the switching elements 22 and 26 (steps $C_6$, $C_2$).

Figure 9A:
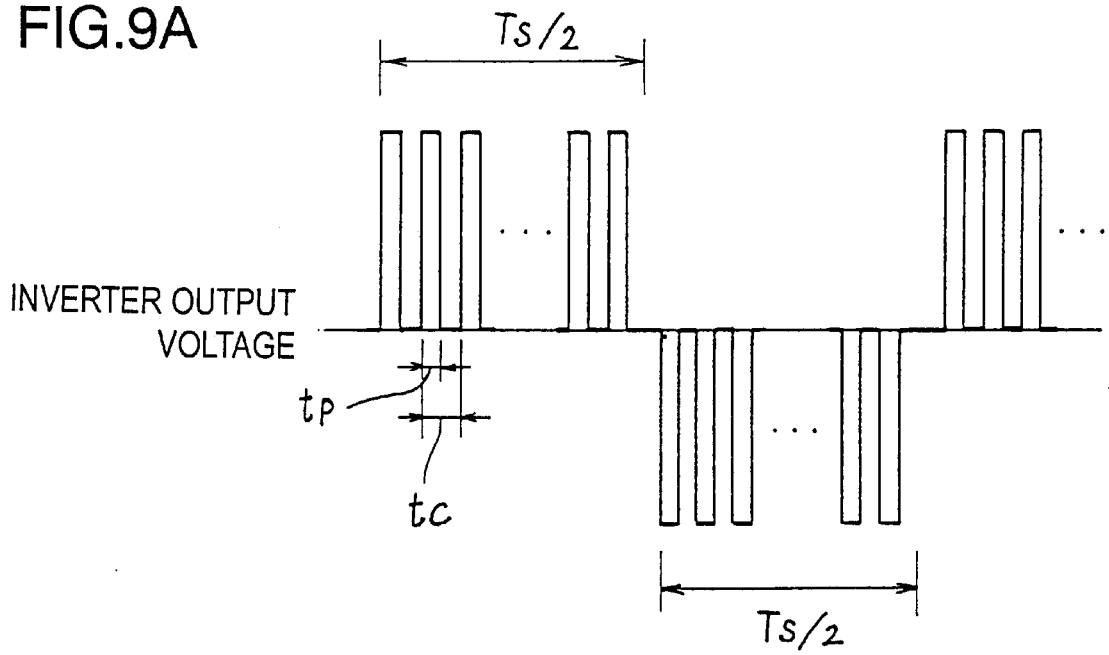
FIGS. 9A and 9B are waveform diagrams at the parts showing the inverter control method of the embodiment.
Figure 9B:
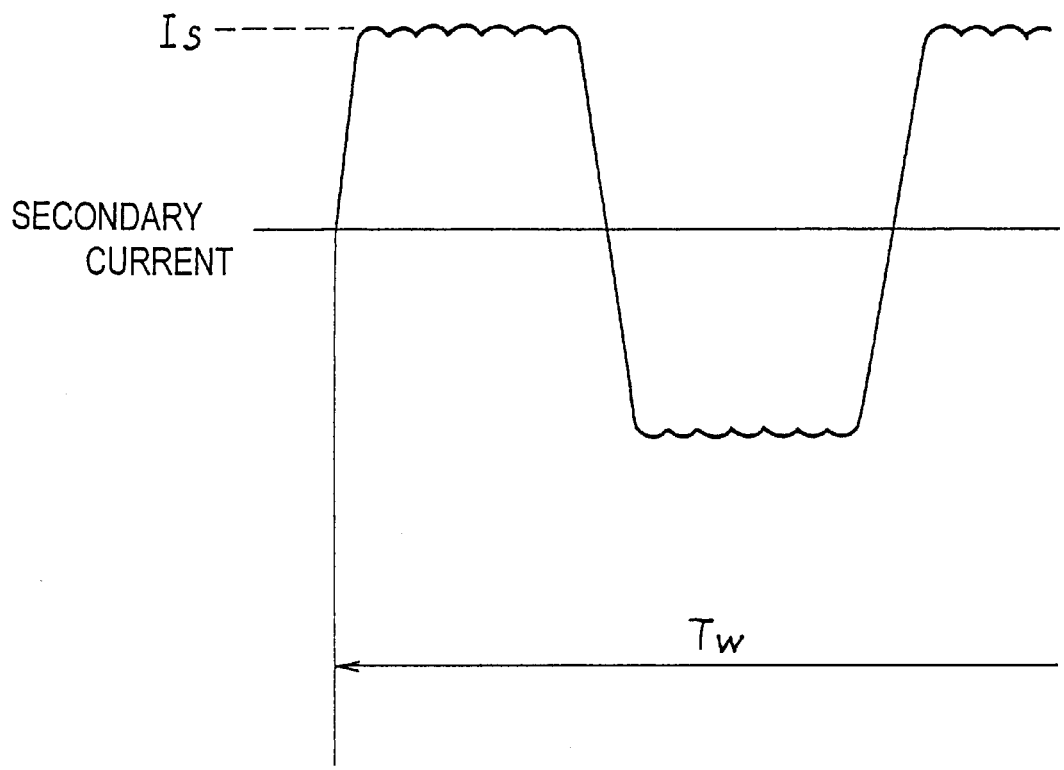

In this manner, during the first unit current-supplying period Ts/2 (10 ms), only the positive side switching elements 22 and 26 of the inverter 16 undergo continuous switching operations at a high frequency (1 kHz) under the feedback pulse width control (step $C_2$ to $C_6$). For the duration, the negative side switching elements 24 and 28 are kept OFF. This allows the secondary current $I_2$ (welding current I) that is constant-current controlled so as to substantially coincide with the set value of current [HEAT] (Is) (600A) to flow in the positive direction through the secondary circuit of the welding transformer 18 (FIGS. 9A and 9B).

After the ending of the first unit current-supplying period (Ts/2), the control unit 32 increments the current-supplying cycle counter by one (step $C_7$) and reverses the inverter polarity flag to its negative side (step $C_9$), to move to the control of the second unit current-supplying period Ts/2.

In the second unit current-supplying period Ts/2 (10 ms), the control unit 32 subjects only the negative side switching elements 24 and 28 to continuous switching operations at a high frequency (1 kHz) under the feedback pulse-width control while keeping OFF the positive side switching elements 22 and 26 of the inverter 16 (steps $C_2$ to $C_6$). This allows the secondary current 12 (welding current I) that is constant-current controlled so as to substantially coincide with the set current value [HEAT] (Is) (600A) to flow in the negative direction through the secondary circuit of the welding transformer 18 (FIGS. 9A and 9B).

After the ending of the second unit current-supplying period (Ts/2 ) (10 ms), the count value of the current-supplying cycle counter reaches the set value 2Ns (the value is 2) whereupon the first weld period [WELD1] comes to an end (steps $C_8$ to $C_{10}$).

The control unit 32 then measures the cooling time [COOL] by means of a predetermined timer and thereafter commences the current-supplying control of the second weld time [WELD2]. In the second weld time [WELD2] as well, the parts are controlled in accordance with the same procedure (FIG. 8) as in the above first weld time [WELD1]. Note that individual set values of conditions are given through the initialization (step $C_1$). In particular, the set value of current [HEAT] (Is) is given as 750A, the secondary AC waveform set frequency Fs as 60.6 Hz, the set number of cycles Ns as 4, and the unit current-supplying period Ts/2 as 8.25 ms. The control unit 32 provides the current-supplying control depending on these set values of conditions (steps $C_2$ to $C_9$).

As a result, the feedback control allows the secondary current $I_2$ (welding current I) substantially coinciding with the set current value [HEAT] (Is) (750A) to flow, in the form of a substantially trapezoidal current waveform, in the positive direction during the former unit current-supplying period Ts/2 (8.25 ms) of each AC waveform cycle but in the negative direction during the latter unit current-supplying period Ts/2 (8.25 ms).

Upon the ending of the eighth unit current-supplying period Ts/2 (8.25 ms), the count value of the current-supplying cycle counter reaches the set value 2Ns, whereat the second weld time [WELD2] is terminated (steps $C_8 \rightarrow C_{10}$).

The control unit 32 then measures the hold time [HOLD] by means of the predetermined timer and thereafter ceases to issue the weld force control signal FC to the pressing unit 40 (to allow the signal FC to go low), to thereby release the workpieces W from the compression of the electrodes 34 and 36. A nugget is formed at a weld portion between the workpieces W, i.e., two metallic members 46 and 48 to obtain a metallurgical joint.

In the AC waveform inverter power supply apparatus of this embodiment, as described above, when the user sets and enters a desired set value Tw by the unit of time (ms) for each weld time [WELD], the power supply unit automatically sets as a set value Tw for that weld time [WELD] the frequency Fs of the optimum secondary AC waveform cycle which is integral multiples of the cycle of the set fundamental frequency <SET>F so that the current-supplying control can be effected at that set frequency Fs. Thus, any setting of the weld time would ensure the alternate positive and negative current supply without inducing any excessive residual magnetic flux in the welding transformer 18.

The user can freely and more precisely set the weld time. The increased degree of freedom (range of selection) of the weld time will contribute to the weld quality diversification and level enhancement.

This embodiment further enables the user to grasp or manage the weld time by the number of cycles since the secondary AC waveform set frequency Fs (Hz) and set number of cycles Ns obtained by the power supply unit are indicated for the user input set weld time Tw (ms) on the setting screen (FIG. 2B).

The AC waveform inverter power supply apparatus of the above embodiment has been directed to the resistance welding. However, solder plating or tinning may be applied on the joint surfaces of the workpieces W, i.e., of the two members 46 and 48 so that the two members 46 and 48 can be soldered together by the same supply of current as the above.

The above embodiment AC waveform inverter power supply apparatus may be used as a power supply apparatus for fusing processing.

Figure 10A:
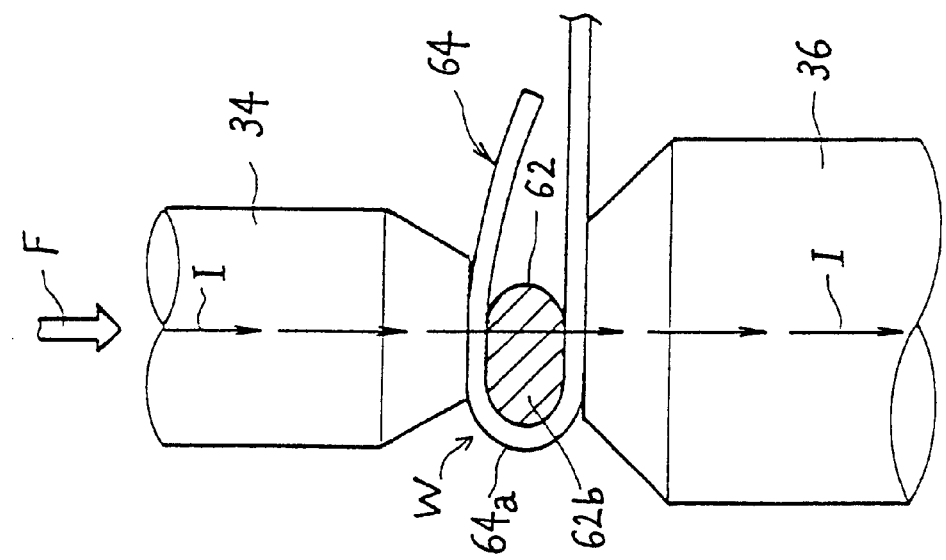
FIGS. 10A to 10C illustrate an example of the fusing process of the embodiment.
Figure 10B:
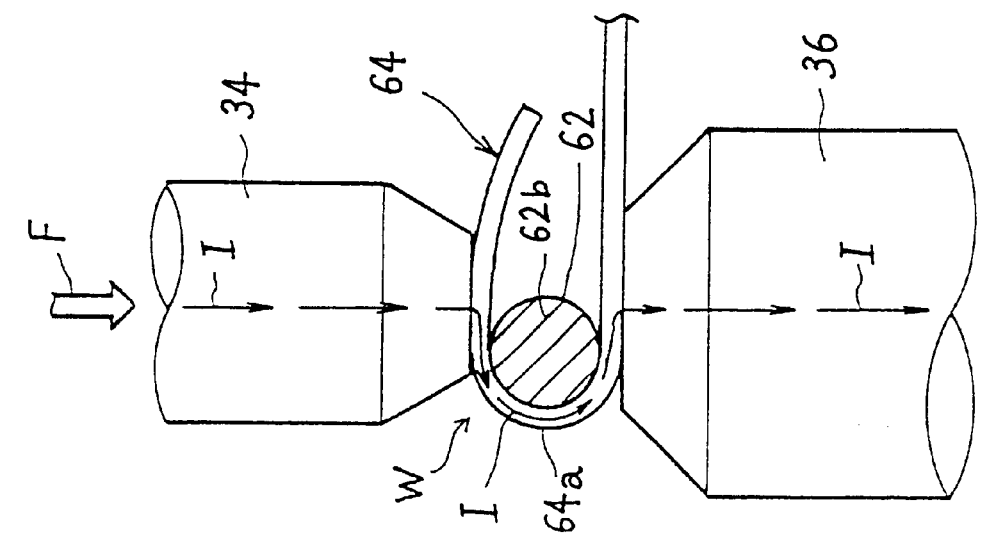
Figure 10C:
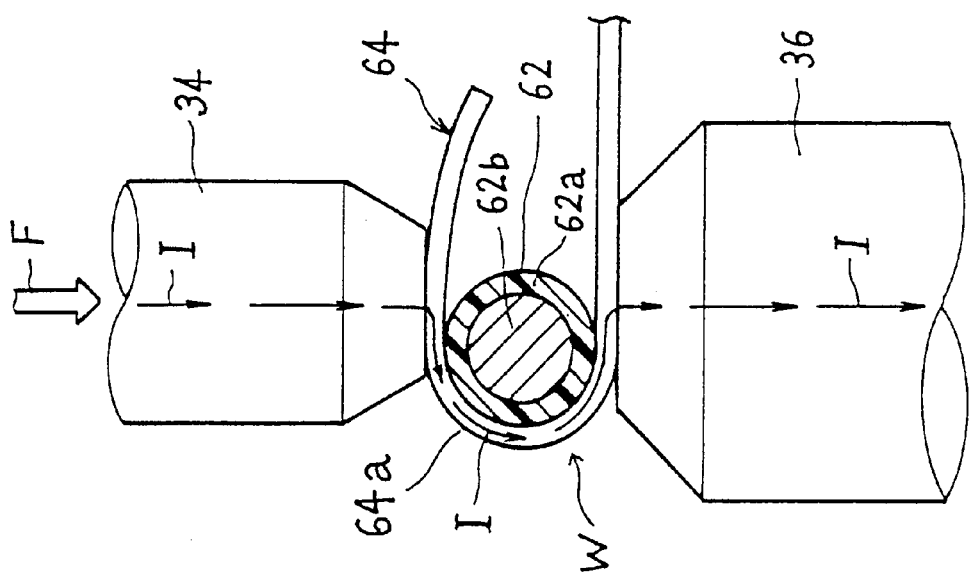

FIGS. 10A to 10C depict an example of the fusing processing. In this fusing processing, a coated wire 62 and a plate-like terminal 64 made of copper alloy are electrically and physically connected together.

First, as shown in FIG. 10A, the workpieces W are the terminal 64 having a hooked portion or a bent portion 64a and the coated wire 62 placed inside of the hooked portion 64 and consisting of an insulator 62a and a conductor 62b. The workpieces W are interposed between the two electrodes 34 and 36, with the lower electrode 36 providing a support for the underside of t he electrode hooked portion 64a in position, and with the upper electrode 34 abutting against the top surface of the terminal hooked portion 64a so that the pressing unit 40 can press down the upper electrode by a predetermined electrode force F. At the same time, the power supply unit 10 applies an AC waveform secondary voltage across the two electrodes 34 and 36.

Then, a current I first flows between the two electrodes 34 and 36 through the terminal hooked portion 64a serving as a current path, to allow the terminal hooked portion 64a to generate Joule heat. As a result, the insulator 62a of the coated wire 62 is melted by the Joule heat and is removed from the conductor 62b as shown in FIG. 10B.

Once the insulator 62a is removed, the current I can flow between the two electrodes 34 and 36 by way of the conductor (typically copper) 62b of the coated wire 62 as shown in FIG. 10C. During the current-supplying period, the electrode force F is continuously applied across the two electrodes 34 and 36 so that the terminal hooked portion 64a and the coated wire conductor 62b are joined through pressure welding or squash by the Joule heat and the electrode force F. This allows the two members, i.e., the coated wire 62 and the terminal 64 to electrically and physically firmly connected together. No nugget (weld joint) will appear between the coated wire conductor 62b and the terminal 64 due to the extremely small resistance of the coated wire conductor 62b and of the terminal 64.

The AC waveform inverter power supply apparatus is available also as a power supply apparatus for reflow soldering.

Figure 11:
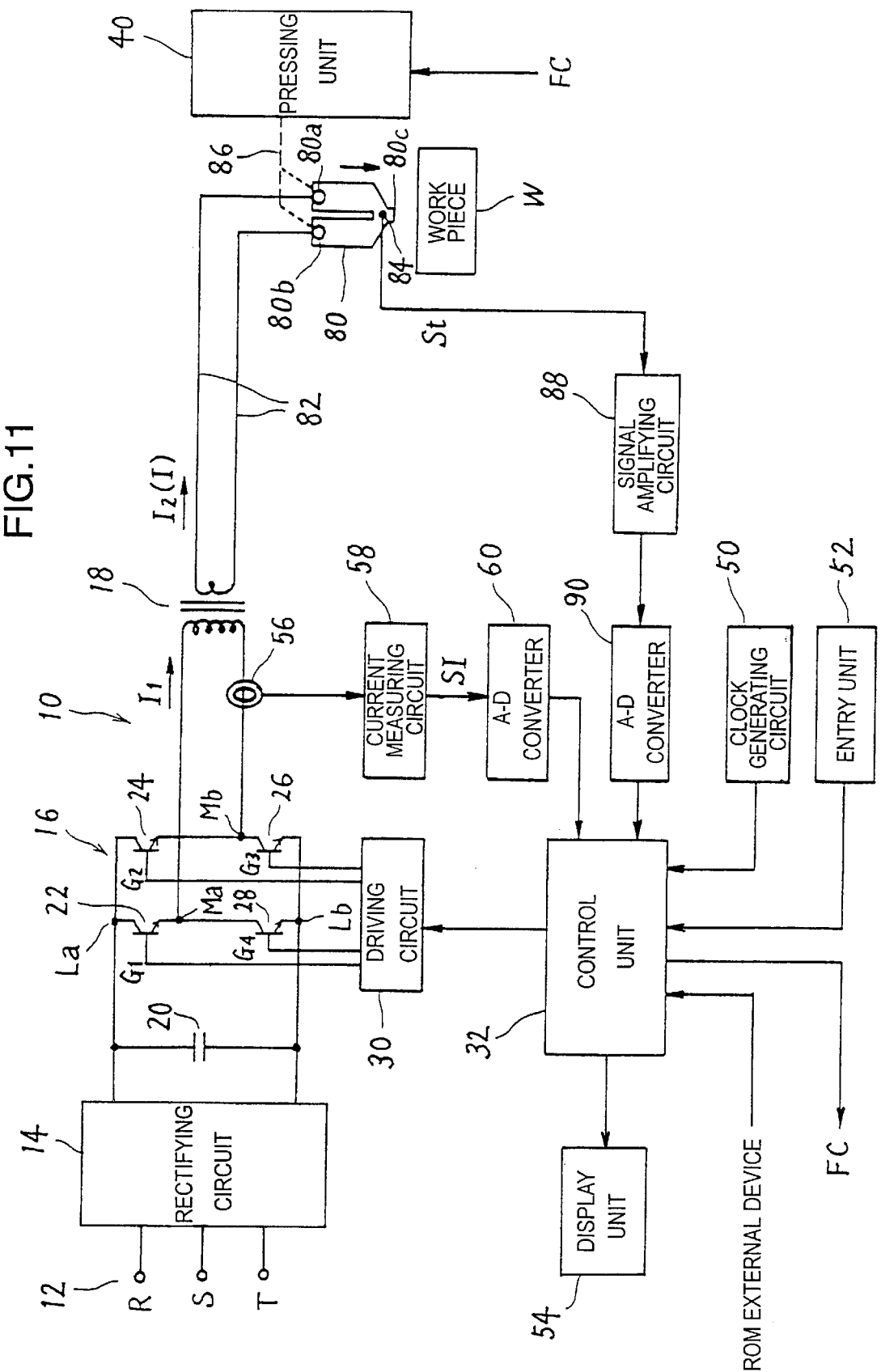
FIG. 11 is a block diagram showing the structure of an AC waveform inverter power supply apparatus for reflow soldering in accordance with another embodiment of the present invention.

FIGS. 11 depicts the structure of the AC waveform inverter power supply apparatus for reflow soldering in accordance with another embodiment of the present invention. The same reference numerals are sent to substantially the same features and functions as those of the power supply apparatus for resistance welding (FIG. 1) described hereinabove.

Referring to FIG. 11, the apparatus comprises a heater tip 80 having opposite terminals 80a and 80b that are connected only via secondary conductors 82 to associated ends of the secondary coil of the transformer 18 without intervention of any rectifying circuit.

The heater tip 80 is made of a metal resistor having high heat generation properties, e.g., molybdenum, and when a current flows between the two terminals 80a and 80b, generates heat by resistance heating. A thermocouple 84 acts as a temperature sensor and is attached to the vicinity, e.g., side faces of a point 80c of the heater tip 80. The thermocouple 84 issues an electric signal (temperature detection signal) indicative of the temperature near the point 80c.

The heater tip 80 is releasably attached to a tip support member 86 of the pressing unit 40. In response to a pressure control signal FC from the control unit 32, the pressing unit 40 drives the tip support member 86 to press the heater tip 80 against the workpieces W for pressing.

To provide a feedback control of the heating temperature of the heater tip 80, this power supply apparatus comprises an amplifying circuit 88 which amplifies an analog temperature detection signal St from the thermocouple 84 attached to the heater tip 80, the thus amplified analog signal St being converted by the A-D (analog-to-digital) converter 90 into a digital signal and fed to the control unit 32.

Figure 12:
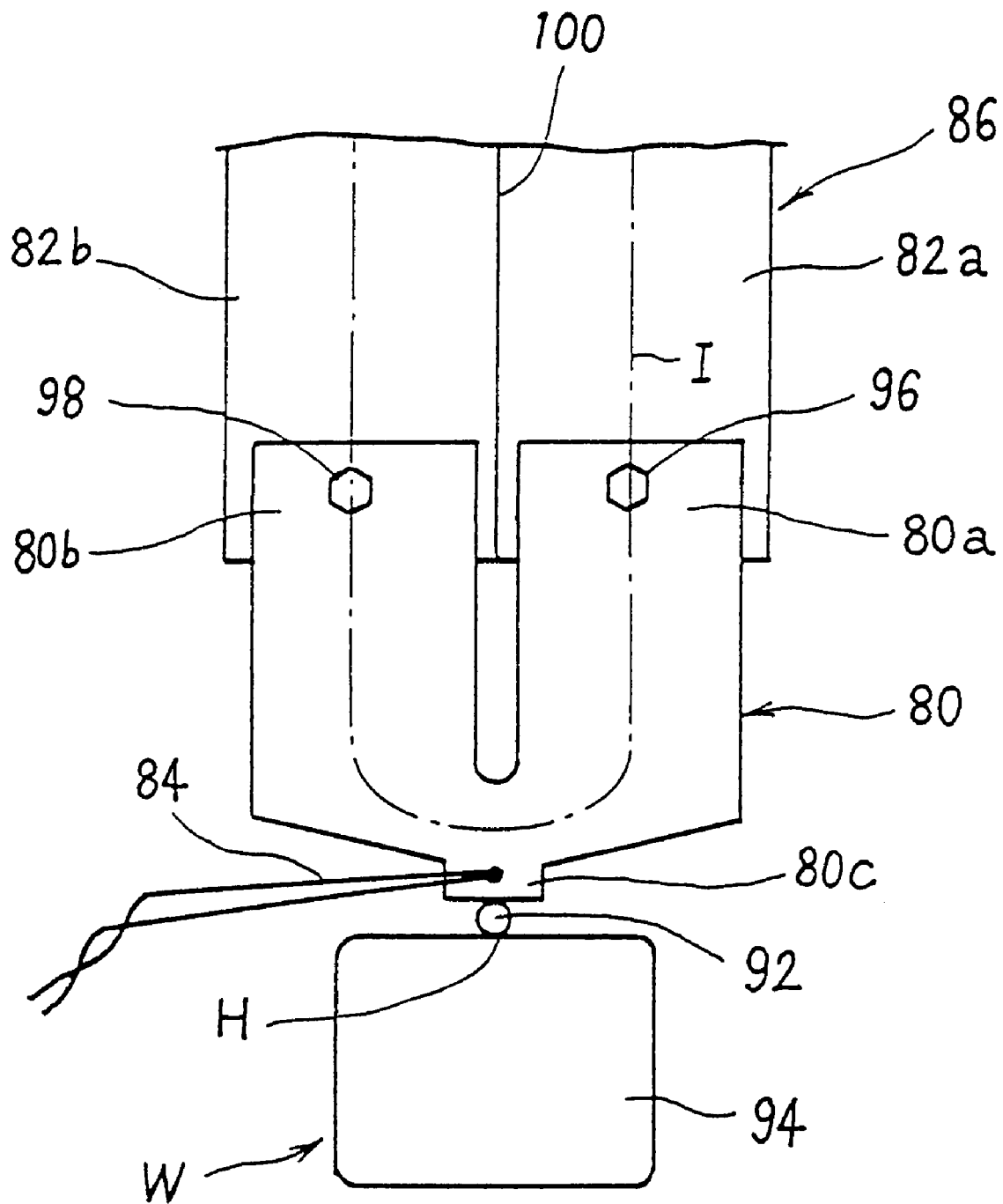
FIG. 12 shows an example of the reflow soldering process of the embodiment.

In this power supply apparatus as well, similar to the power supply apparatus for resistance welding (FIG. 1) described hereinbefore, the user sets a desired current-supplying time by the unit of time (ms) whilst the apparatus determines an optimum secondary AC waveform set frequency Fs depending on the set fundamental frequency <SET>F and the set current-supplying time to provide a current-supplying control on the basis of the set frequency Fs. The heater tip 80 generates heat by resistance heating as a result of supply of current, and as shown in FIG. 12, heats and presses the sites H to be soldered of the workpieces W (92, 94) by use of its point 80c. Cream solder is previously applied onto the joint surfaces of the sites H to be soldered so that the cream solder can melt under the pressure and heating from the heater tip 80. When the pressure is cancelled after the termination of the supply of current, the solder solidifies and the sites H to be soldered of the workpieces W (92, 94) are physically and electrically connected to each other by way of the thus solidified solder.

In the process example of FIG. 12, one member 92 of the workpieces W is a coil and the other member 94 is a terminal. The lower end portion of the tip support member 86 Is made of an electrically conductive material, e.g., copper and Is coupled to the two terminals 80a and 80b of the heater tip 80 by bolts 96 and 98, respectively. The lower end portion of the tip support member 86 serves also as part of the secondary conductors 82 of the power supply unit 10. The secondary conductors 82 have their respective electrically conductive end portions 82a and 82b that are electrically Insulated from each other by an Insulating material 100.

The modes of setting (setting methods, setting Items, etc.,) effected on the "schedule" screen (FIGS. 2A and 2B) of the above embodiments are merely by way of example, and may variously be modified. For example, the weld time may be set not only by the unit of millisecond (ms) but also by other units of time such as second (s) or μs (microsecond).

In the above embodiments, the power supply apparatus has set the optimum frequency Fs and the number of cycles Ns adapted for the set fundamental frequency, relative to the arbitrarily user set and entered weld time or current-supplying time. These optimum set frequency Fs and set cycle count Ns will normally suffice. The apparatus configuration may however be such that the user can vary the set frequency or the set number of cycles as the user desires.

In the setting example of FIG. 2B, the power supply apparatus finds the optimum set frequency Fs (60.6 Hz) and set number of cycles Ns (4) adapted for the set fundamental frequency <SET>F (50 Hz), relative to the set value Tw (66 ms) of the second weld time [WELD2], and indicates the thus found set values on the screen. From this setting information, the user may be able to vary the set number of cycles Ns to 5 for example. In this case, the power supply apparatus again computes the set frequency Fs and provides the indication of a re-set value 75.7 (Hz) on the screen.

Although in the above embodiments the set weld time Tw has equally been divided into a plurality of (integral multiples of) AC waveform cycles, it may be divided into a plurality of AC waveform cycles each having a different frequency. In this unequal division method, another setting technique may be employed as depicted In FIGS. 13A and 13B, 15A and 15B, and 16A and 16B for example, in which the set weld time Tw preferably includes a single or a plurality of fundamental AC waveform cycles having the set fundamental frequency <SET>F, with the remaining weld time Tg equally divided Into a single or a plurality of second AC waveform cycles having a frequency different from the fundamental frequency. The second AC waveform cycles preferably have a frequency higher than and most approximate to the basic frequency for the remaining weld time Tg.

More specifically, in the setting example of FIGS. 13A and 13B, the set weld time Tw (66 ms) includes three fundamental AC waveform cycles (which correspond to 60 ms) having the fundamental frequency <SET>F (50 Hz), with the remaining weld time (6 ms) including a single 167 Hz AC waveform cycle.

Figure 15A:
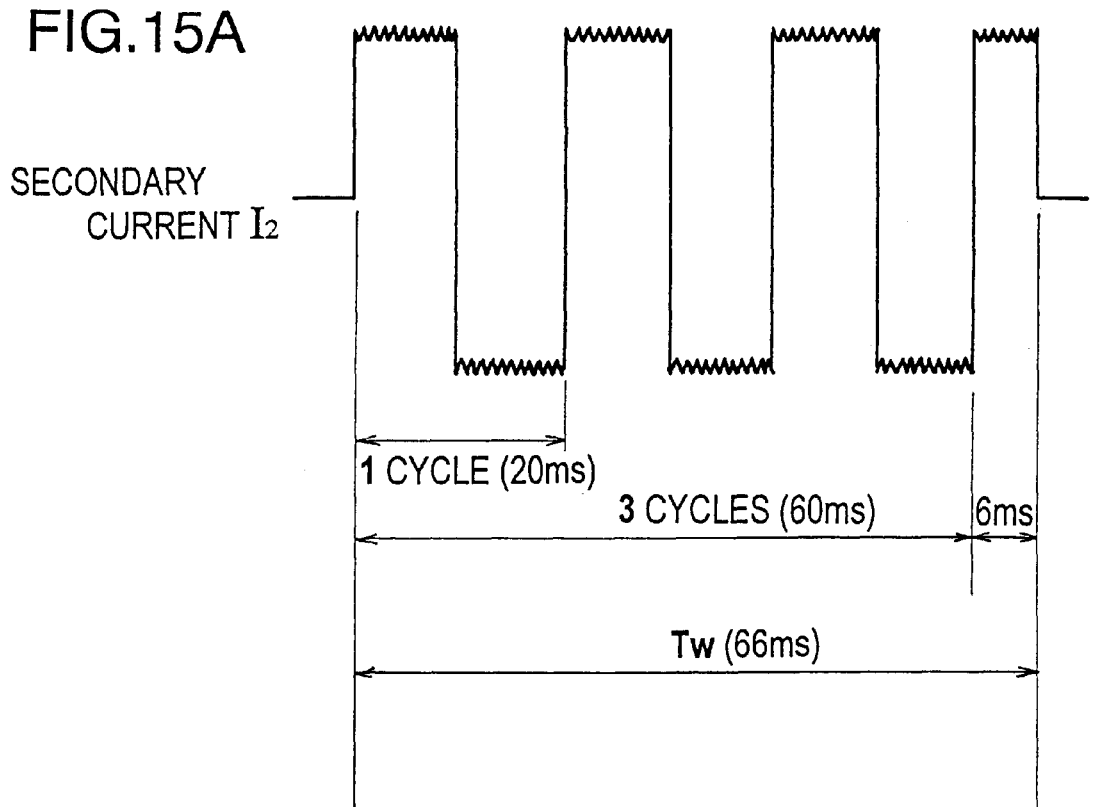
FIGS. 15A and 15B are waveform diagrams showing the secondary AC frequency/cycle setting method of another variant of the embodiment.
Figure 15B:
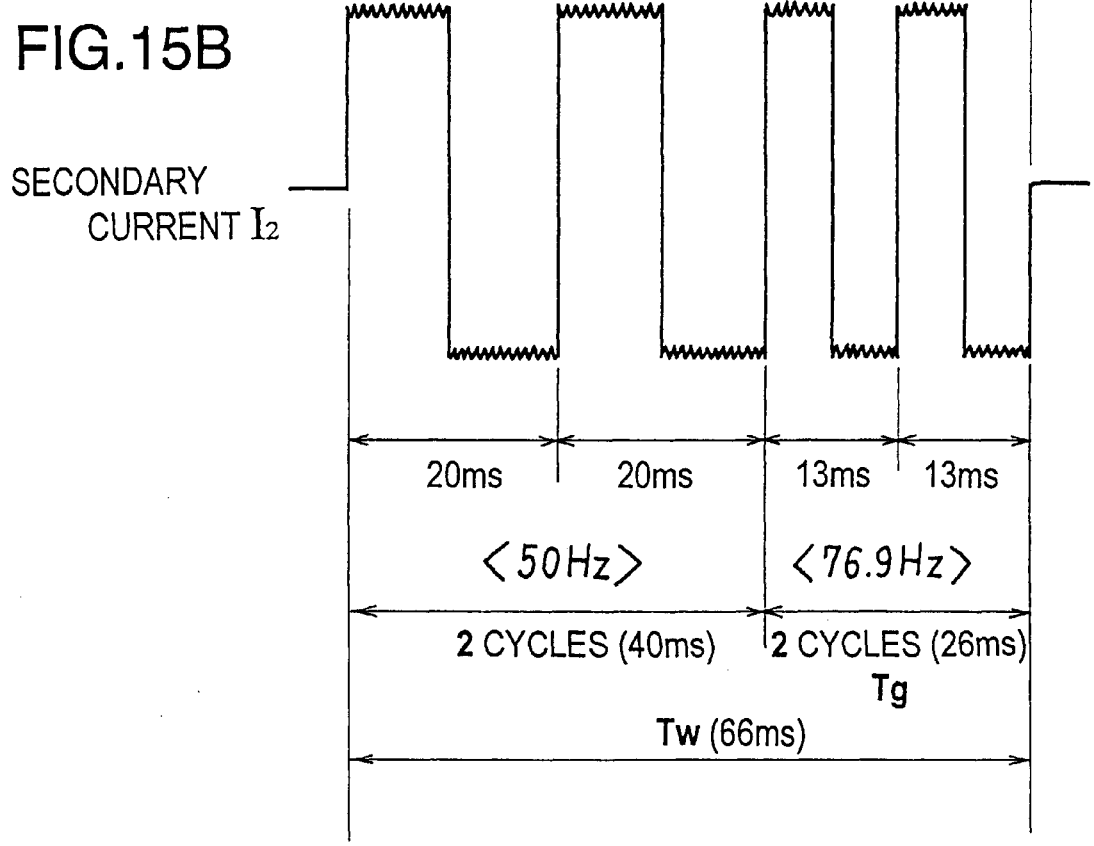

In the setting example of FIGS. 15A and 15B, the set weld time Tw (66 ms) includes two fundamental AC waveform cycles (which correspond to 40 ms) having the fundamental frequency <SET>F (50 Hz), with the remaining weld time (26 ms) including two 76.9 Hz AC waveform cycles.

Figure 16A:
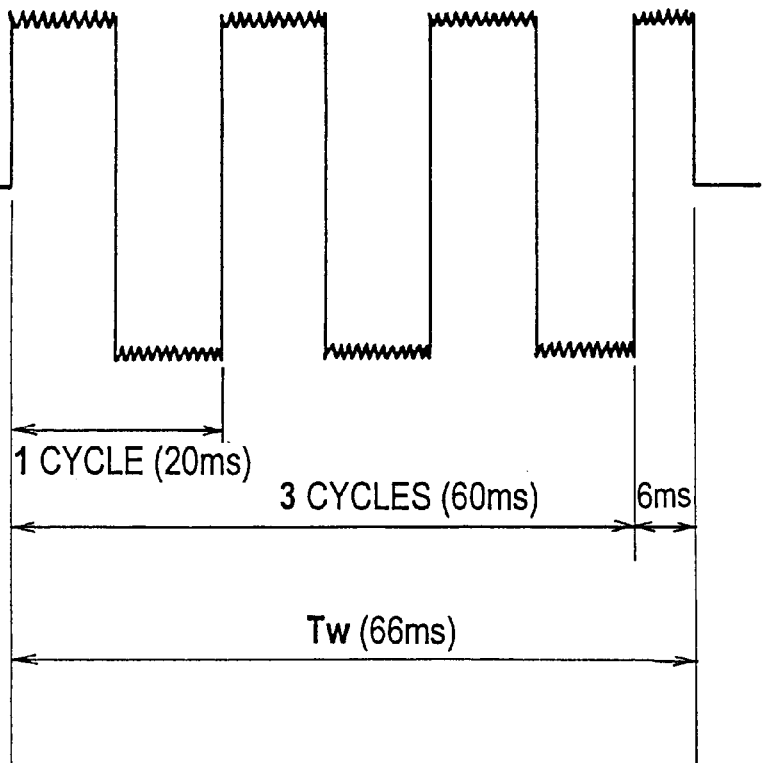
FIGS. 16A and 16B are waveform diagrams showing the secondary AC frequency/cycle setting method of a further variant of the embodiment.
Figure 16B:
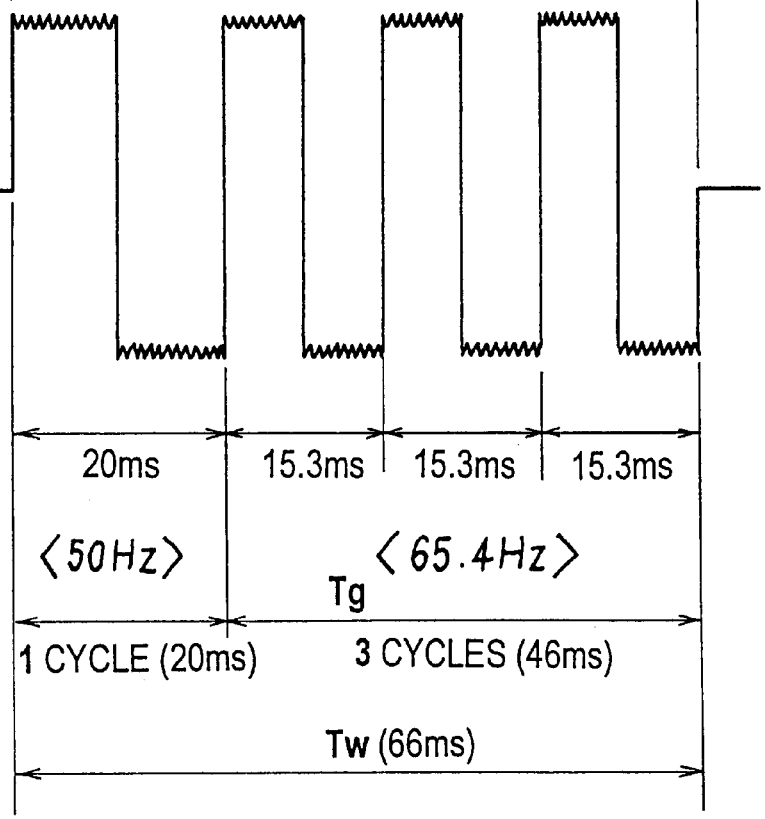
Figure 17A:
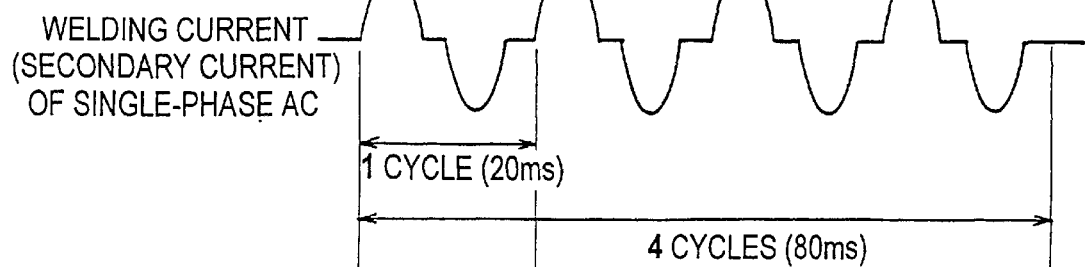
FIGS. 17A and 17B are waveform diagrams showing the weld time setting methods of conventional AC single-phase and AC waveform inverter power supply apparatus.
Figure 17B:
Figure 18:
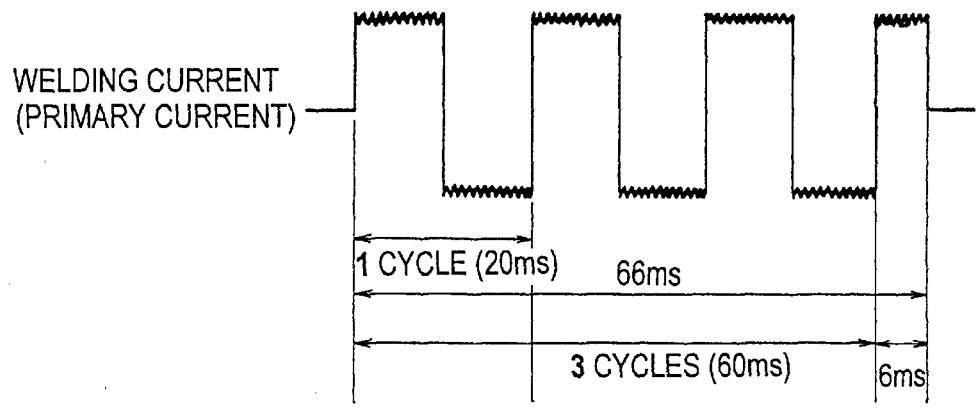
FIGS. 18 is waveform diagram showing the inconvenience which may occur when the weld time is defined by the time in the AC waveform inverter power supply apparatus.

In the setting example of FIGS. 16A and 16B, the set weld time Tw (66 ms) includes a single fundamental AC waveform cycle (which corresponds to 20 ms) having the fundamental frequency <SET>F (50 Hz), with the remaining weld time (46 ms) including three 65.4 Hz AC waveform cycles.

FIG. 14 depicts, by way of example, indications on the "schedule" screen corresponding to the setting example of FIGS. 13A and 13B. As seen in this indication example, in case of setting the single set weld time Tw (66 ms) by a plurality of AC waveform cycles each having a different frequency, the setting contents (frequency, number of cycles, weld time, etc.,)for the respective AC waveform cycles may be listed for display in order to notify the user of the setting information.

This unequal division method may also enable the user to vary the AC waveform cycle setting contents provided from the apparatus, as the user desires. In the same manner as the above equal division method.

Although in the above embodiments, the three-phase alternating current of a commercial frequency has been converted into a direct current for the supply to the inverter 16, the conversion into the direct current may be made of a single-phase alternating current having the commercial frequency. The circuit configuration of the inverter 16 is merely shown by way of example and may variously be modified. The current waveform in each unit current-supplying period is not limited to the trapezoidal one as in the above embodiments, but instead may be controlled to any current waveform.

Although the current-supplying control of the above embodiments has employed the PWM (pulse width modulation) method for the feedback constant-current control, another method may be used such as a current peak-value control or limiter control method by allowing the current peak value to conform to the set value for each inverter frequency cycle.

According to the AC waveform inverter power supply apparatus for metallic member joining or reflow soldering of the present invention, as set forth hereinabove, it is possible to arbitrarily set and manage the desired weld time by the unit of time without inducing any abnormality or degradation in the transformer, as well as to achieve the enhanced processing quality and improved quality control by allowing more precise setting of the weld time.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. An AC waveform inverter power supply apparatus for metallic member joining, comprising:
    a rectifying circuit which converts an AC voltage of a commercial frequency into a DC voltage;
    an inverter which converts said DC voltage output from said rectifying circuit into a pulsed voltage of a high frequency;
    a transformer having primary terminals and secondary terminals, said primary terminals being electrically connected to output terminals of said inverter, said secondary terminals being electrically connected to electrodes, respectively, which join workpieces in the form of metallic members together, without intervention of any rectifying circuit;
    weld time setting means arranged to set a weld time by the unit of time;
    AC waveform cycle setting means arranged to divide said set weld time into a plurality of AC waveform cycles; and
    inverter control means arranged to provide a control of switching operations of said inverter in such a manner as to allow said inverter to issue said high-frequency pulses with one polarity in the former half cycle of divided each AC waveform cycle but to issue said high-frequency pulses with the other polarity in the latter half cycle thereof.

2. An AC waveform inverter power supply apparatus for reflow soldering, comprising:
    a rectifying circuit which converts an AC voltage of a commercial frequency into a DC voltage;
    an inverter which converts said DC voltage output from said rectifying circuit into a pulsed voltage of a high frequency;
    a transformer having primary terminals and secondary terminals, said primary terminals being electrically connected to output terminals of said inverter, said secondary terminals being electrically connected to terminals, respectively, of a reflow soldering heater tip, without intervention of any rectifying circuit;
    current-supplying time setting means arranged to set a current-supplying time by the unit of time;
    AC waveform cycle setting means arranged to divide said set current-supplying time into a plurality of AC waveform cycles; and
    inverter control means arranged to provide a control of switching operations of said inverter in such a manner as to allow said inverter to issue said high-frequency pulses with one polarity in the former half cycle of divided each AC waveform cycle but to issue said high-frequency pulses with the other polarity in the latter half cycle thereof.

3. An AC waveform inverter power supply apparatus according to claim 1, wherein
    said AC waveform cycle setting means include means arranged to equally divide said set weld time into a plurality of AC waveform cycles.

4. An AC waveform inverter power supply apparatus according to claim 2, wherein
    said AC waveform cycle setting means include means arranged to equally divide said set current-supplying time into a plurality of AC waveform cycles.

5. An AC waveform inverter power supply apparatus according to claim 3, wherein
    said AC waveform cycle setting means include set frequency computing means arranged to determine as a set frequency the frequency allowing an equal division of said set weld time into a least number of AC waveform cycles, among frequencies equal to or higher than a predetermined fundamental frequency.

6. An AC waveform inverter power supply apparatus according to claim 4, wherein
    said AC waveform cycle setting means include set frequency computing means arranged to determine as a set frequency the frequency allowing an equal division of said set current-supplying time into a least number of AC waveform cycles, among frequencies equal to or higher than a predetermined fundamental frequency.

7. An AC waveform inverter power supply apparatus according to claim 1, wherein
    said AC waveform cycle setting means include means arranged to divide said set weld time into a single or a plurality of first AC waveform cycles each having a predetermined fundamental frequency and arranged to divide a remaining weld time obtained by subtracting a weld time corresponding to said first AC waveform cycle(s) from said set weld time into a single or a plurality of second AC waveform cycles having a frequency which is higher than and most approximate to said fundamental frequency.

8. An AC waveform inverter power supply apparatus according to claim 2, wherein
    said AC waveform cycle setting means include means arranged to divide said set current-supplying time into a single or a plurality of first AC waveform cycles each having a predetermined fundamental frequency and arranged to divide a remaining current-supplying time obtained by subtracting a current-supplying time corresponding to said first AC waveform cycle(s) from said set current-supplying time into a single or a plurality of second AC waveform cycles having a frequency which is higher than and most approximate to said fundamental frequency.

9. An AC waveform inverter power supply apparatus according to any one of the preceding claims, further comprising:
    AC waveform cycle setting information display means arranged to provide indications of the setting contents of said AC waveform cycle determined by said AC waveform cycle setting means.

* * * * *